(12) United States Patent
Hsieh

(10) Patent No.: US 8,783,655 B2
(45) Date of Patent: Jul. 22, 2014

(54) CONNECTOR STRUCTURE FOR PRESSURE PIPE

(71) Applicant: Hsi Yin Hsieh, Lukang Township, Changhua County (TW)

(72) Inventor: Hsi Yin Hsieh, Lukang Township, Changhua County (TW)

( * ) Notice: Subject to any disclaimer, the term of this patent is extended or adjusted under 35 U.S.C. 154(b) by 0 days.

(21) Appl. No.: 13/678,215

(22) Filed: Nov. 15, 2012

(65) Prior Publication Data

US 2014/0130919 A1    May 15, 2014

(51) Int. Cl.
*F16L 37/28* (2006.01)

(52) U.S. Cl.
USPC .................. 251/149.4; 251/149.1; 251/149.6

(58) Field of Classification Search
USPC ........... 251/149.1, 149.3, 149.4, 149.6, 149.9
See application file for complete search history.

(56) References Cited

U.S. PATENT DOCUMENTS

| 1,971,132 | A | * | 8/1934 | Crowley | 251/149.4 |
| 2,968,497 | A | * | 1/1961 | Treleman | 251/149.4 |
| 3,093,357 | A | * | 6/1963 | Rodgers et al. | 251/149.4 |
| 3,807,687 | A | * | 4/1974 | Thompson | 251/149.4 |
| 5,279,124 | A | * | 1/1994 | Aymond | 60/533 |
| 2005/0194557 | A1 | * | 9/2005 | Hall | 251/149.4 |

* cited by examiner

*Primary Examiner* — John Rivell
*Assistant Examiner* — Matthew W Jellett
(74) *Attorney, Agent, or Firm* — Muncy, Geissler, Olds & Lowe, P.C.

(57) ABSTRACT

A connector structure for a pressure pipe includes a female connector and a male connector. The female connector includes a piston and a positioning sleeve therein. The female connector has inner threads. The positioning sleeve has outer threads. A nut is fitted on the positioning sleeve. The outer threads of the positioning sleeve are mated with the inner threads of the female connector. The piston has an insertion section to be inserted in the positioning sleeve. The insertion section has a slot and is provided with a first seal ring. The male connector has threads on an outer wall thereof for engagement of the nut of the female connector. The male connector has a coupling section and a second seal ring.

2 Claims, 3 Drawing Sheets

CONNECTOR STRUCTURE FOR PRESSURE PIPE

BACKGROUND OF THE INVENTION

1. Field of the Invention

The present invention relates to a connector structure for a pressure pipe, and more particularly, to a connector structure which has a better seal effect and is durable and can be connected tightly and firm.

2. Description of the Prior Art

As shown in FIG. 1 and FIG. 2, a conventional connector structure for a pressure pipe comprises a female connector 10 and a male connector 20. The female connector 10 has a flange 11 therein and is provided with a piston 12 and an inner spring 13. The female connector 10 further comprises engaging balls 14, a control sleeve 15 and an outer spring 16 at an outer end thereof. The male connector 20 has an annular groove 21 on an outer wall thereof and comprises a piston 22 and an inner spring 23 therein. When not in use, the male connector 20 disengages from the female connector 10. The piston 12 biased by the inner spring 13 of the female connector 10 is to block the flange 11, as shown in FIG. 1, so as to provide a seal effect. When in use, as shown in FIG. 2, the male connector 20 is inserted in the female connector 10 and the engaging balls 14 are engaged in the annular groove 21 of the male connector 20. The pistons 22, 12 of the male connector 20 and the female connector 10 push each other to form an open state, such that the pneumatic pressure passes the male connector 20 through the female connector 10. The conventional connector structure has the following shortcomings.

1. The piston 12 of the female connector 10 must cooperate with the inner spring 13. The spring has the problem of elastic fatigue so it is not durable. When the elasticity of the spring is not enough, the seal effect is not good.

2. The male connector 20 and the female connector 10 are connected through the engaging balls 14, the elasticity of the outer spring 16 and the engagement of the control sleeve 15, so they cannot be connected tightly. Sometimes, the male connector 20 may disengage from the female connector 10 by touching the control sleeve 15 carelessly.

3. It must provide a plurality of steel engaging balls 14. The structure is complicated and the cost is high. The connection of the engaging balls 14 is not good.

Accordingly, the inventor of the present invention has devoted himself based on his many years of practical experiences to solve these problems.

SUMMARY OF THE INVENTION

The primary object of the present invention is to provide a connector structure for a pressure pipe. The connector structure comprises a female connector and a male connector. The female connector includes a piston and a positioning sleeve therein. The female connector has inner threads. The positioning sleeve has outer threads. A nut is fitted on the positioning sleeve. The outer threads of the positioning sleeve are mated with the inner threads of the female connector. The piston has an insertion section to be inserted in the positioning sleeve. The insertion section has a slot and is provided with a first seal ring. The male connector has threads on an outer wall thereof for engagement of the nut of the female connector. The male connector has a coupling section and a second seal ring. The piston can provide a seal and endurable effect, without a spring. The threads on the outer wall of the male connector are mated with the nut of the female connector so that the male and female connectors are connected tightly and firm.

DETAILED DESCRIPTION OF THE PREFERRED EMBODIMENTS

Embodiments of the present invention will now be described, by way of example only, with reference to the accompanying drawings.

Figure 1:
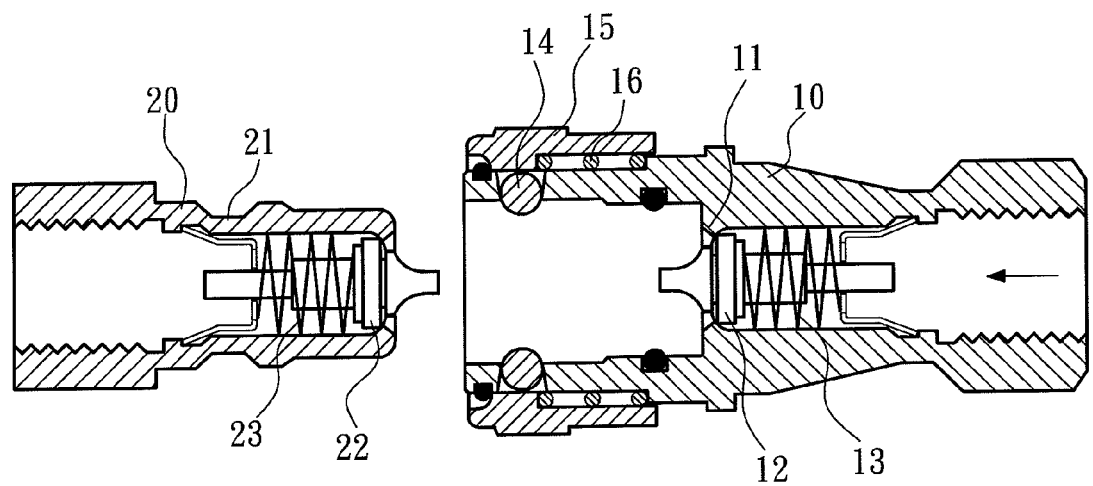
FIG. 1 is a sectional view of a conventional connector structure.
Figure 2:
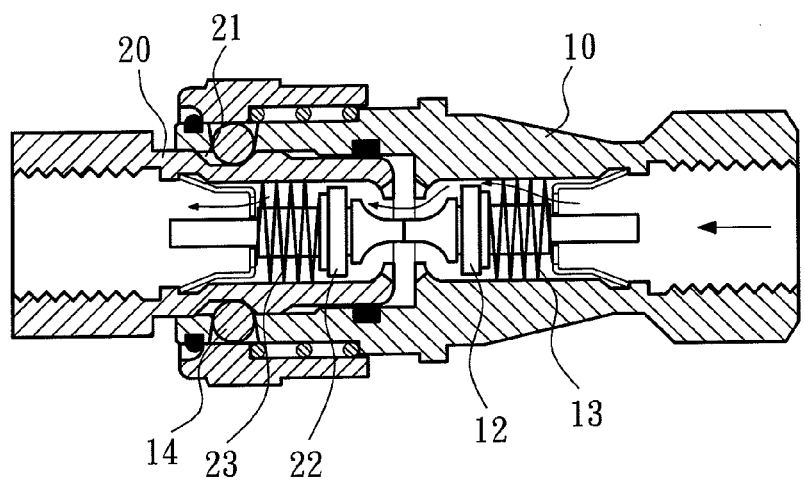
FIG. 2 is a sectional view of the conventional connector structure in an assembled state.
Figure 3:
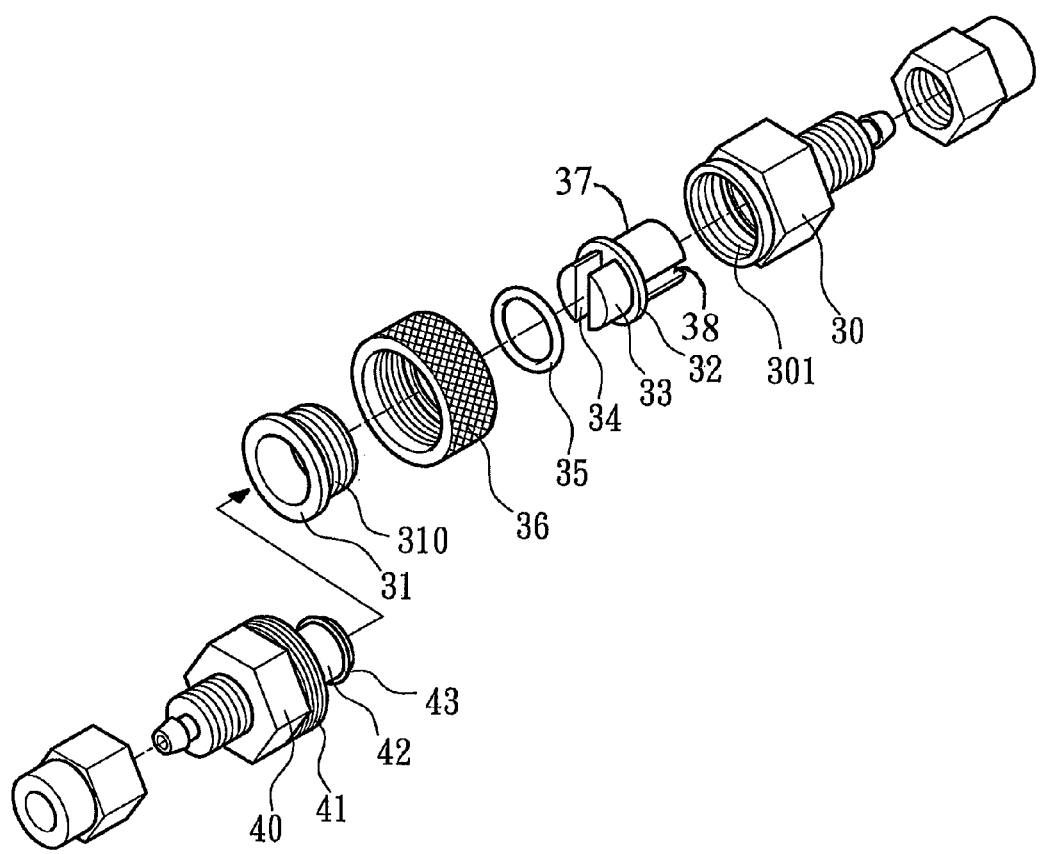
FIG. 3 is an exploded view of the present invention.
Figure 4:
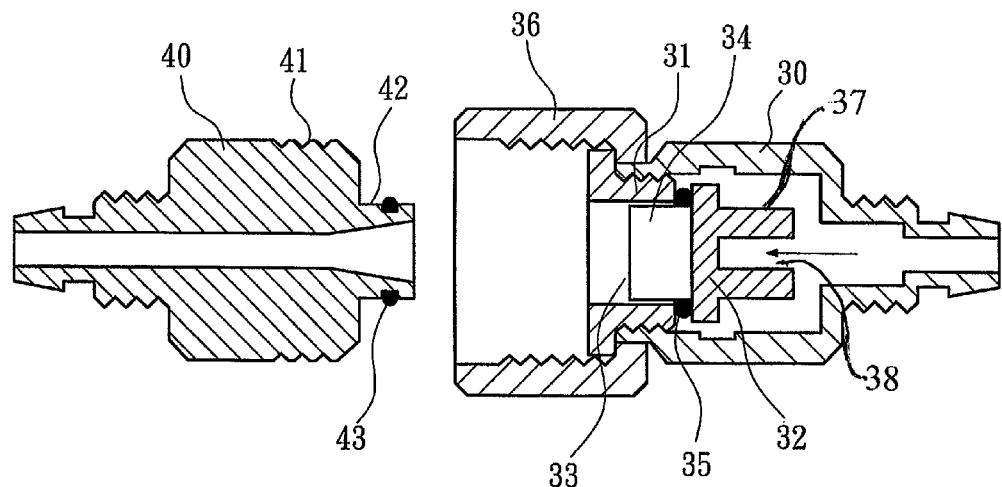
FIG. 4 is a sectional view of the present invention.
Figure 5:
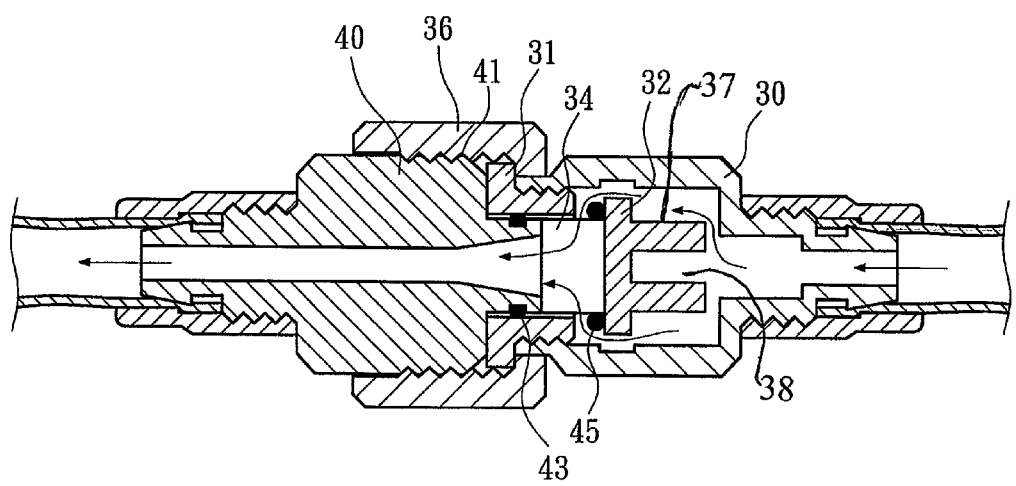
FIG. 5 is a sectional view of the present invention in an assembled state.

Referring to FIG. 3 to FIG. 5, the connector structure for a pressure pipe of the present invention comprises a female connector 30 and a male connector 40. The female connector 30 comprises a piston 32 and a positioning sleeve 31 therein. The female connector 30 has inner threads 301. The positioning sleeve 31 has outer threads 310. A nut 36 is fitted on the positioning sleeve 31. The outer threads 310 of the positioning sleeve 31 are mated with the inner threads 301 of the female connector 30. The piston 32 has an insertion section 33 to be inserted in the positioning sleeve 31. The insertion section 33 has a slot 34 and is provided with a first seal ring 35. The piston 32 also has a rear section 37 with a slot 38. The slot 38 is perpendicular to the slot 34 of the insertion section. The male connector 40 has threads 41 on an outer wall thereof for engagement of the nut 36 of the female connector 30. The male connector 40 has a coupling section 42 and a second seal ring 43. When the male connector 40 is inserted and coupled to the female connector 30, the coupling section 42 of the male connector 40 is adapted to move the piston 32 of the female connector 30 backward to become an open state.

As shown in FIG. 4, when not in use, the male connector 40 disengages from the female connector 30 and the piston 32 is moved forward by the pneumatic pressure from the female connector 30 to block the positioning sleeve 31, providing a seal effect. As shown in FIG. 5, when the male connector 40 is inserted in the female connector 30, the coupling section 42 of the male connector 40 is to push the insertion section 33 of the piston 32 of the female connector 30 so that the piston 32 is moved backward to be an open state. Thus, the pneumatic pressure connected with the female connector 30 flows through the slot 34 of the insertion section 33 to the male connector 40. Besides, the male connector 40 has the outer threads 41 to mate with the nut 36 of the female connector 30.

The present invention has the following effects and advantages.

1. The piston 32 of the female connector 30 can provide a seal effect, without using a spring. Therefore, there is no problem causing by the elastic fatigue of the spring to result in bad seal or breakdown.

2. Through the nut 36, the male connector 40 and the female connector 30 are connected tightly and firm and won't be disengaged from each other by accident.

3. There is no need for the female connector 30 to provide engaging balls and an outer spring in order to engage with the male connector. The structure of the present invention is simple to lower the manufacture cost.

4. The positioning sleeve 31 has the outer threads 310 to mate with the inner threads 301 of the female connector 30, such that they can be assembled conveniently and tightly and disassembled conveniently for cleaning.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A connector structure for a pressure pipe, comprising a female connector and a male connector, the female connector comprising a piston and a positioning sleeve, the female connector having inner threads, the positioning sleeve having outer threads, a nut fitted on the positioning sleeve, the outer threads of the positioning sleeve being mated with the inner threads of the female connector, the piston having an insertion section to be inserted in the positioning sleeve, the insertion section having a slot on a face of the insertion section toward the male connector and transverse to a longitudinal direction of the connector structure and being provided with a first seal ring, the piston also having a rear section with a slot which is perpendicular to the slot of the insertion section and also perpendicular to the longitudinal direction of the connector structure, the male connector having threads on an outer wall thereof for engagement of the nut of the female connector, the male connector having a coupling section and a second seal ring, wherein, when the male connector is inserted and coupled to the female connector, the coupling section of the male connector is adapted to move the piston of the female connector backward to become an open state.

2. The connector structure for a pressure pipe according to claim 1, wherein, in the open state, fluid is allowed to pass around an outer part of said insertion section and through said slot into a longitudinal passage in said male connector.

* * * * *